Feb. 10, 1959 A. G. SWENSON 2,873,329
THERMOSTAT CALIBRATION MEANS
Filed Oct. 15, 1957
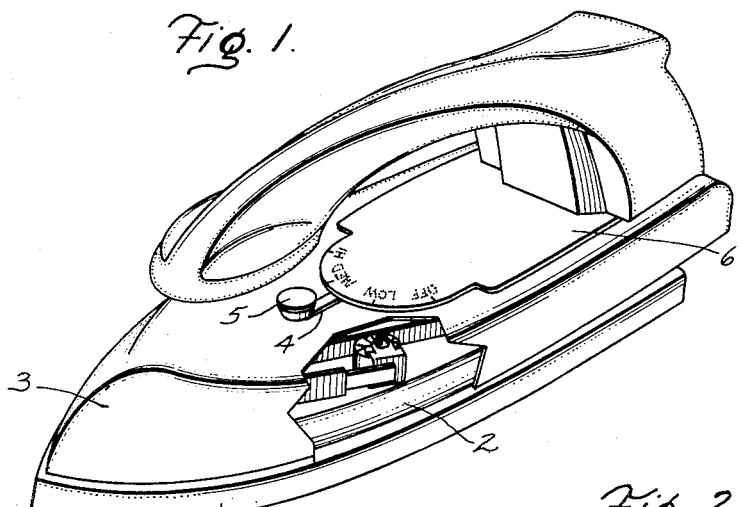
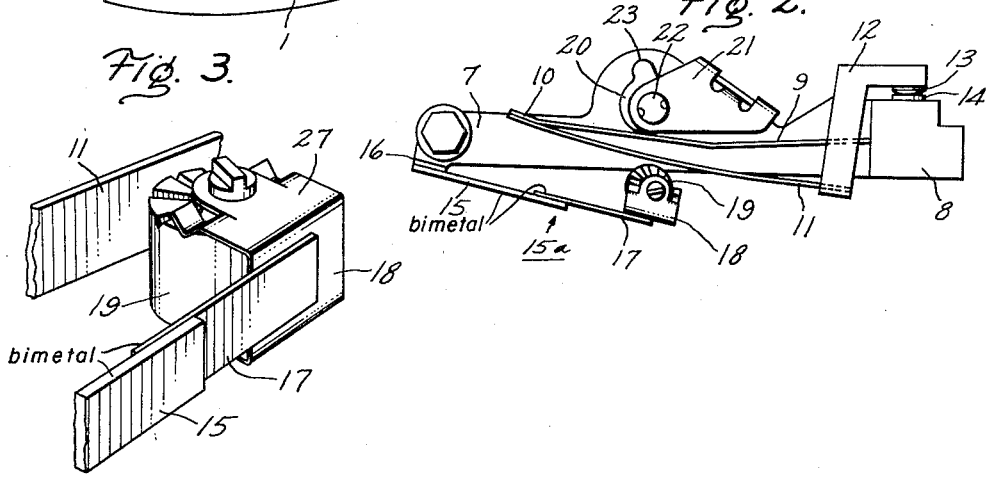
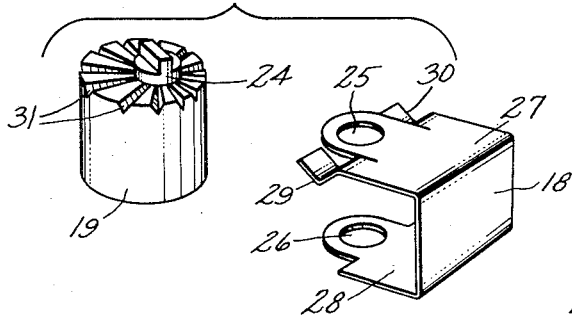
Inventor:
Alfred G. Swenson
by Lawrence L. Kempton
His Attorney

United States Patent Office 2,873,329
Patented Feb. 10, 1959

2,873,329

THERMOSTAT CALIBRATION MEANS

Alfred G. Swenson, Ontario, Calif., assignor to General Electric Company, a corporation of New York Application October 15, 1957, Serial No. 690,235

7 Claims. (Cl. 200—139)

My invention relates to thermostats and more particularly to calibration means for an adjustable thermostat.

It is frequently necessary or desirable to construct a thermostat wherein a temperature adjustment member includes means for insuring that the thermostat electrical contacts are out of engagement at one end of the operating temperature range. This has been termed a "positive off" and has been used, for example, in electric flatirons wherein the normal operating range is considerably above room temperature. Past attempts at providing a positive off have not been completely satisfactory since, in many cases, calibration of the thermostat has been provided for in a connection between the temperature adjustment member and the thermostat proper. The placement of calibration means at this connection causes a shifting of the temperature adjustment member with respect to the temperature indicia scale during the calibration of the thermostat. As a result of this shift, the off position of the temperature adjustment member becomes misaligned with the indicated off position on the indicia scale. In accordance with my invention, a calibrating arrangement is provided which overcomes this problem and secures both accurate calibration of and an aligned positive off position for the temperature adjustment member.

Accordingly, it is an object of my invention to provide improved calibrating means for adjustable thermostats.

Another object of my invention is to provide improved calibrating means which facilitate the incorporation of a positive off position in a thermostat temperature adjustment member.

A further object of my invention is to provide a simple and positive calibration means which will remain positively locked in its calibrated position.

Further objects and advantages of my invention will become apparent as the following description proceeds.

Briefly stated, in accordance with one embodiment of my invention, I provide a calibration cam mounted on a thermally responsive member. The cam and member cooperate with a leaf spring to effect the opening of thermostat electrical contacts. The calibration cam is mounted independently of the temperature adjustment member and allows calibration to be performed without shifting the temperature adjustment arm relative to its temperature indicia scale. In addition to the calibration cam, means are provided which cooperate with the temperature adjustment member to positively open the thermostat electrical contacts in the off position irrespective of the actual temperature existing in the device being controlled.

While the specification concludes with claims particularly pointing out and distinctly claiming the subject matter which I regard as my invention, it is believed that the invention will be better understood from the following description taken in connection with the accompanying drawings in which:

Fig. 1 is a perspective view, partly in section, of a flatiron embodying the invention.

Fig. 2 is a top plan view of a thermostat embodying the invention.

Fig. 3 is a detailed perspective view of the calibrating means.

Fig. 4 is an exploded detailed perspective view of a portion of the structure shown in Fig. 3.

Referring to Fig. 1, there is shown an electric flatiron which includes a soleplate 1 having an electric heating element 2 cast therein. Positioned on the soleplate is a suitable cover 3 which encloses a thermostat structure. An adjusting member 4, for varying the temperature setting of the flatiron, extends through the cover. A button 5 is provided in an accessible position on the end of the member 4 for operating the member. Dial plate 6 is positioned atop cover 3 and contains suitable indicia for indicating the temperature setting of the adjusting member 4.

As shown in Fig. 2 the thermostat structure comprises a metal base plate or frame member 7 to which is attached, at its rear end, a block 8 of insulating material. Anchored on block 8 is a leaf spring 9 which extends along base plate 7 to a point adjacent to the forward end of the base plate. The leaf spring 9 is provided at its free end with a connecting portion 10 to which is attached, preferably by a weld, a second leaf spring 11 which extends back in spaced, generally parallel, relation to leaf spring 9 to a point adjacent to insulating block 8. At its rear end leaf spring 11 is provided with an angularly bent end portion 12 in the shape of an inverted L which projects over block 8 and carries a movable contact 13. A stationary contact 14 is mounted on block 8 and is arranged to cooperate with movable contact 13 for controlling the energization of the heating element 2. Leaf springs 9 and 11 form, in substance, a single leaf spring member which is reversely bent on itself with one end anchored to block 8 and the other end carrying a contact positioned in line with block 8. The springs may be of the same or different thicknesses, the thicknesses being such as to give the desired resiliency to the spring members. They are arranged edgewise with respect to soleplate 1 so that in operation they move in a plane parallel to the soleplate.

The spring assembly comprising leaf springs 9 and 11 is biased, by its inherent resiliency, to hold contact 13 in engagement with contact 14 and it is adapted to be moved to separate the contacts by an operating arm 15a which includes a bimetal element 15. The operating arm 15a is fixed to an ear 16 at the forward end of base plate 7 and is comprised of a bimetal element 15, a compensating bimetal element 17, a U-shaped spring clip 18, and an eccentric cam 19 formed from insulating material.

Adapted to engage leaf spring 9 for controlling the temperature setting of the flatiron is a control cam 20 formed from insulating material. Control cam 20 is pivotally mounted between base plate 7 and an ear 21 carried by the base plate, the cam being provided with trunnions which engage in openings in the base plate and the ear. The upper trunnion 22 of cam 20 projects through an opening in cover 3 and the adjusting member 4 is attached to this trunnion. By turning adjusting member 4, the cam can be adjusted to cause a lateral movement of leaf spring 9, which in turn effects a change in the temperature setting of the thermostat.

In Fig. 2, movable contact 13 is shown held against stationary contact 14 with a pressure as predetermined primarily by spring 11. The contact pressure is only slightly affected by the position of spring 9, because when spring 9 is flexed the leaf spring 11 and contact 13 tend to pivot with respect to fixed contact 14. Eccentric cam 19 stands out of engagement with leaf spring 11. This is the heating or closed position of the thermostat. As bimetal element 15 heats due to heating of soleplate 1, the operating arm 15a flexes toward leaf spring 11, eventually engaging the spring; and, after a predetermined pressure of eccentric cam 19 against leaf spring 11 has been built up, contact 13 is moved away from contact 14.

The thermostat structure thus far described, with the exception of spring clip 18 and eccentric cam 19, forms no part of the present invention, but is described in detail and claimed in Patent 2,723,336 to A. G. Swenson et al., issued November 8, 1955, and assigned to the assignee of the present invention. I, therefore, do not herein claim anything shown or described in said patent, which is to be regarded as prior art with respect to this present application.

In accordance with my invention, I provide a new and improved relationship between eccentric calibration cam 19, bimetal element 15, and control cam 20 for effecting calibration of temperature adjusting member 4 and for providing a positive off position on the temperature adjusting member. The off position occurs when the raised portion 23 of control cam 20 is in engagement with leaf spring 9. In this position, contact 13 stands well away from contact 14 since leaf spring 11 is forced down against eccentric cam 19 which in turn causes contact 13 to be lifted from contact 14 de-energizing the heating element. As control cam 20 is turned in a clockwise direction from the position just described, it releases pressure on leaf spring 9, eventually permitting leaf spring 11 to move from engagement with eccentric cam 19 and allowing contact 13 to move into engagement with contact 14. Such a position of the parts would correspond to one flatiron temperature. As soleplate 1 heats, bimetal element 15 is correspondingly heated, and when it reaches a predetermined temperature, eccentric cam 19 is brought into engagement with leaf spring 11 to effect movement of contact 13 away from contact 14. The maximum flatiron temperature setting is effected when the lowest portion of control cam 20 is directly over leaf spring 9.

In order to provide a permanent alignment between the adjusting member off position and the indicia off position and still allow calibration of the high temperature range of the thermostat, eccentric cam 19 is provided for calibration purposes. Referring to Figs. 3 and 4, the eccentric cam 19 is provided with upper and lower trunnions, one of which is shown as upper trunnion 24. A U-shaped spring clip 18 is provided having bearing holes 25 and 26 in which the trunnions are supported. The bearing holes are located in upper and lower spring leg members 27 and 28 respectively, formed in the U-shaped spring clip. In order to retain eccentric cam 19 in its calibrated position, spring detent arms 29 and 30 are struck out from the upper leg 27 of U-shaped spring clip 18. The spring detent arms cooperate with a plurality of notches 31 formed in the end surface of eccentric cam 19. The cooperation between the spring detent arms and the notches allows the eccentric cam to be releasably held in any one of a number of calibrating positions.

It is obvious to those skilled in the art that the U-shaped spring clip 18 and eccentric calibration cam 19 may be mounted on leaf spring 11 rather than on compensating bimetal element 17 to achieve the same relationship between bimetal element 15 and control cam 20.

As shown in Fig. 2, clockwise rotation of the eccentric cam 19 up to its highest point will bring the surface of eccentric cam 19 closer to leaf spring 11. By closing this distance, bimetal element 15 will be caused to exert its influence on spring member 11 at a lower temperature, thereby opening contacts 13 and 14 at a lower temperature. Thus, it may be seen that proper positioning of eccentric cam 19 will calibrate the indicia on dial plate 6 so that they correspond accurately to the temperature of the iron.

While I have shown and described a particular embodiment of my invention, it will be obvious to those skilled in the art that various changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In an electric flatiron including a heating element, adjustable temperature control means comprising: a switch having a movable contact carried by a plurality of connected movable arms, at least one of which is resilient; a cam in engagement with one of said switch arms for varying the relative position of said one switch arm for temperature selection; manuallly adjustable means associated with a fixed scale connected to said cam; a bimetallic element movable responsive to iron operating temperature; and adjustable calibration means interposed between and movable with said bimetallic element and another of said switch arms; said calibration means comprising a spring clip carrying an eccentric cam with detent means for releasably holding said eccentric cam in calibrated position.

2. In an electric flatiron including a heating element, adjustable temperature control means comprising: a switch for controlling the supply of power to the flatiron, said switch having a plurality of movable arms at least one of which is resilient and at least one of which effects the opening of a pair of contacts; a cam in engagement with one of said switch arms for varying the relative position of said one switch arm for temperature selection; manually adjustable means associated with a fixed scale connected to said cam; a bimetallic element movable responsive to iron operating temperature; and adjustable calibration means including an eccentric cam associated between said bimetallic element and another of said movable switch arms, whereby switch temperature calibration can be accomplished independently of said manually adjustable means and fixed scale.

3. In an electric flatiron including a heating element, adjustable temperature control means comprising: a switch for controlling the supply of power to the flatiron, said switch having a first leaf spring supported at one end, a second leaf spring mounted on the free end of said first leaf spring and extending in spaced relation to said first leaf spring, an adjustable member engaging said first leaf spring for varying the temperature setting of the iron, said adjustable member including means for positively holding said switch in its open position regardless of the temperature of the flatiron, a bimetallic member for actuating said second leaf spring to effect opening and closing of said switch, and means independent of said adjustable member and including an eccentric cam mounted on said bimetallic member for calibrating said adjustable temperature control means.

4. In an electric flatiron including a heating element, adjustable temperature control means comprising: a switch for controlling the supply of power to the flatiron, an adjustable member for varying the temperature setting of the flatiron, means for positively holding said switch in its open position regardless of the temperature of the flatiron, a bimetallic member for effecting opening and closing of said switch to control the temperature of the flatiron, a U-shaped spring clip mounted on said bimetallic member, and an eccentric cam supported by said spring clip, said cam being rotatable to vary the distance from said switch to said cam to calibrate said adjustable temperature control means.

5. The combination of claim 4 wherein said eccentric cam includes at least one notched surface, and said spring clip includes detent means engaging said notched surface for releasably holding said eccentric cam in any of a plurality of calibrating positions.

6. The combination of claim 4 wherein said switch includes a first leaf spring supported at one end a second leaf spring mounted on the free end of said first leaf spring and extending in spaced relation to said first leaf spring, and wherein said adjustable member engages said first leaf spring for varying the temperature setting of the flatiron and said eccentric cam engages said second leaf spring.

7. In an electric flatiron including a heating element, adjustable temperature control means comprising: a switch for controlling the supply of power to the flatiron, said switch having a plurality of movable arms at least one of which is resilient and at least one of which effects the opening of a pair of contacts; a cam in engagement with one of said switch arms for varying the relative position of said one switch arm for temperature selection; manually adjustable means associated with a fixed scale connected to said cam; a bimetallic element movable responsive to iron operating temperature; a spring clip mounted on said bimetallic element, said spring clip having detent means formed thereon; and an eccentric cam rotatably mounted on said spring clip, said eccentric cam including an end face having a plurality of notches formed thereon, said notches and said detent means cooperating to releasably hold said eccentric cam in any of a plurality of calibrating positions.

References Cited in the file of this patent

UNITED STATES PATENTS

| | | |
|---|---|---|
| 2,723,336 | Swenson et al. | Nov. 8, 1955 |
| 2,807,690 | Schwaneke | Sept. 24, 1957 |